United States Patent [19]

Tomita et al.

[11] Patent Number: 4,848,983
[45] Date of Patent: Jul. 18, 1989

[54] CATALYTIC COAL GASIFICATION BY UTILIZING CHLORIDES

[75] Inventors: Akira Tomita; Yasuo Ohtsuka; Takayuki Takarada; Toshihide Nabatame, all of Sendai, Japan

[73] Assignee: Tohoku University, Sendai, Japan

[21] Appl. No.: 105,351

[22] Filed: Oct. 6, 1987

[30] Foreign Application Priority Data

Oct. 9, 1986 [JP] Japan .............................. 62-239358

[51] Int. Cl.[4] .............................. C10J 3/14; C10J 3/16
[52] U.S. Cl. ...................................... 48/202; 48/206; 48/210
[58] Field of Search .................. 48/197 R, 202, 203, 48/206, 210, 209; 252/373

[56] References Cited

U.S. PATENT DOCUMENTS

| | | | |
|---|---|---|---|
| 4,069,304 | 1/1978 | Starkover et al. | 48/202 |
| 4,092,125 | 5/1978 | Stanbaugh et al. | 48/210 |
| 4,200,439 | 4/1980 | Lang | 48/202 |
| 4,204,843 | 5/1980 | Neavel | 48/210 |
| 4,318,712 | 3/1982 | Lang et al. | 48/202 |
| 4,500,323 | 2/1985 | Siegfried et al. | 48/202 |
| 4,508,543 | 4/1985 | Peter | 48/202 |
| 4,551,155 | 11/1985 | Wood et al. | 48/202 |
| 4,558,027 | 12/1985 | McKee et al. | 48/197 R |

FOREIGN PATENT DOCUMENTS 2530600 1/1977 Fed. Rep. of Germany ........ 48/202

OTHER PUBLICATIONS

Johnson, Kinetics of Coal Gasification, John Wiley & Son, 1979, pp. 271-278.
"Catalytic Activity of Potassium Halides in Water Vapour Gasification of Graphite", by Klaus J. Huttinger et al., Fuel, 1984, vol. 63, Jan., pp. 9-12.
"Water Vapour Gasification of Carbon-Improved Catalytic Activity of Potassium Chloride Using Anion Exchange", by Klaus J. Huttinger, et al., Fuel, 1985, vol. 64, Apr., pp. 486-490.
"Anion effects in Alkali-Catalysed Steam Gasification", Fuel, 1986, vol. 65, Oct., pp. 1324-1329.
Hashimoto, et al., "Relation Between the Gasification Rate of Carbons Supporting Alkali Metal Salts and the Amount of Oxygen Trapped by the Metal", *Fuel*, vol. 65, pp. 489-494 (Apr. 1986).

*Primary Examiner*—Peter Kratz
*Attorney, Agent, or Firm*—Fleit, Jacobson, Cohn & Price

[57] ABSTRACT

A process of catalytic coal gasification characterized by mixing an inexpensive, low rank coal with an aqueous solution of inexpensive, widely existing alkali metal or alkaline earth metal chlorides, such as Nacl, KCl, or the like; adding a pH adjustor such as ammonia to the resulting mixture to adjust pH to 5∼12, whereby an ion exchange is effected between said metal and hydrogen in the coal, thereby loading only metals as a catalyst on the coal; washing the coal with water to remove chloride by-products; and running steam onto the catalyst-loaded coal at high temperatures and high pressures.

3 Claims, 2 Drawing Sheets

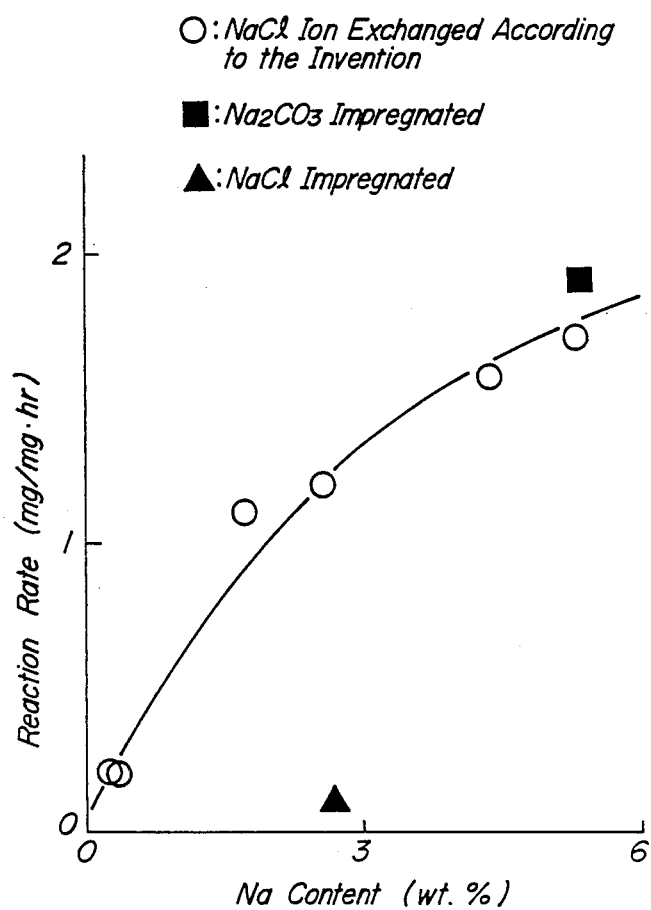
FIG_2

CATALYTIC COAL GASIFICATION BY UTILIZING CHLORIDES

BACKGROUND OF THE INVENTION

1. Field of the Invention

The present invention relates to a process of catalytic gasification of coal by using a highly active alkali metal or alkaline earth metal catalyst for coal gasification, loaded onto a coal, which catalyst is prepared by mixing an inexpensive, low rank coal, such as lignite, brown coal, subbituminous coal and the like, with an aqueous solution of an inexpensive salt such as NaCl, KCl and the like, as a starting material for the catalyst, and only the alkali metal or alkaline earth metal is introduced into the coal as the catalyst.

2. Description of the Prior Art

Coal gasificatiion techniques have been developed for a long time and utilized in the manufacture of synthetic gases and hydrogen gas. Recently, processes of catalytic coal gasification have been actively developed, which are directed to an increase in efficiency of gasification. The processes of catalytic coal gasification promote gasification reactions catalytically, wherein a catalytically active material fed into a gasification furnace together with a coal, is interposed between the coal and a gasifying agent.

There have been reported various substances, such as alkali metal salts, alkaline earth metal salts, VIII group transition metals, etc., which promote coal gasification reactions. Particularly, it has been known that alkali metal carbonates, such as $K_2CO_3$, $Na_2CO_3$ and the like, have a very prominent catalytic effect on steam gasification reactions. In C.C.G. processes that the EXXON group is developing, the steam gasification of coal is effected at 700° C. using $K_2CO_3$ as a catalyst. However, snce the $K_2CO_3$ catalyst reacts with mineral matter in the coal, the complete recovery of the catalyst from reaction residues is substantially impossible. This would be a big problem from an economical point of view. Accordingly, attention has been paid to preparation of highly active gasification catalysts, using inexpensive materials for the catalysts.

Because of low prices and existence in large quantities, alkali chlorides such as NaCl, KCl and the like, therefore, may be preferable as materials for the catalysts. However, the use of these chlorides as a coal gasification catalyst presents two major problems. One is the inactivity of these chlorides for gasification reaction, and the other is corrosion of gasification apparatuses caused by hydrogen chloride generated from said chlorides. Therefore, it is necessary to activate the inactive chlorides to provide good gasification catalysts and further to remove chlorine in advance, so that an appropriate catalyst loading method to be used therefor has been required to be developed.

SUMMARY OF THE INVENTION

An object of the present invention is to provide processes of catalytiic coal gasification, utilizing chlorides, which processes comprise using alkali chlorides, as a material for catalyst, which are inexpensive but are inactive substance per se for coal gasification reactions, and removing chlorine from the chlorides in a catalyst preparation step, to prepare highly active gasification catalysts.

Further object of the present invention is to manufacture synthetic gases and town gases by effective coal gasification processes.

The above objects can be achieved by a catalytic coal gasification process by utilizing chlorides, in accordance with the present invention, which process is characterized by mixing a coal with an aqueous solution of a chloride of at least one metal selected from the group consisting of alkali metals and alkaline earth metals; adding a pH adjustor to a mixture of said coal and the chloride to maintain a pH value in the range between 5 and 12, whereby an ion exchange is effected between said metal(s) and hydrogen in the coal, thereby introducing only said metal(s) as a catalyst into the coal in an amount of 1~10% by weight based on the coal; washing the coal with water to remove chlorides secondarily produced by said ion exchange; and running a gasifying agent such as steam at a temperature of 500°~800° C. under a pressure of 1~100 atm. onto the coal loaded with said catalyst and dechlorinated, to effect a catalytic coal gasification reaction.

BRIEF DESCRIPTION OF THE DRAWINGS

The preferred embodiments of the invention will now be described by way of example with reference to the accompanying drawings in which:

FIG. 2 is a graph illustrating a relation between Na-loading amount and reaction rate in a specimen prepared by using NaCl according to the present invention.

DETAILED DESCRIPTION OF THE INVENTION

Figure 1:
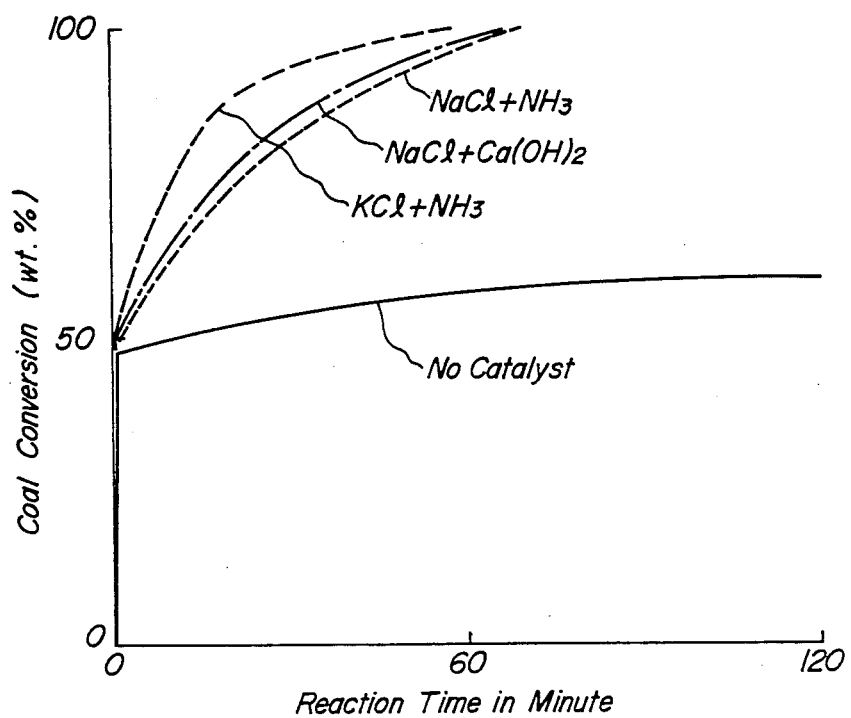
FIG. 1 shows a graph of coal conversion against reaction time in the present invention wherein NaCl and KCl were used as a starting material for the catalyst and, ammonia and $Ca(OH)_2$ werre used as a pH adjustor.

The general feature of the present invention is to prepare highly active coal gasification catalysts by introducing only alkali metals or alkaline earth metals into the coal, using inexpensive alkali metal or alkaline earth metal chlorides, such as NaCl, KCl and the like, as a starting material for the catalysts. Now, when an ion exchange occurs between the above chlorides and the coal in an aqueous solution, the pH of the solution is so lowered that the ion exchange reaction is not allowed to proceed further. So, as a pH adjustor, ammonia or $Ca(OH)_2$ is added gradually in the beginning and/or intermediary stage so as to maintain the pH of the catalyst-loaded solution between about 5 and 12.

The ion exchange and neutralization reactions in the present invention are represented by the following chemical reaction formulae.

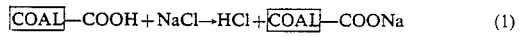

|COAL|—COOH+NaCl→HCl+|COAL|—COONa     (1)

|COAL|—OH+NaCl→HCl+|COAL|—O—Na     (2)

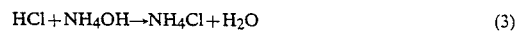

$HCl + NH_4OH \rightarrow NH_4Cl + H_2O$     (3)

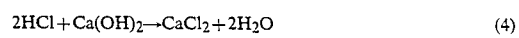

$2HCl + Ca(OH)_2 \rightarrow CaCl_2 + 2H_2O$     (4)

By the ion exchange between H of —COOH or —OH groups in the coal and Na in NaCl, the Na is introduced into the coal, producing HCl. The producing HCl reacts with ammonia, $Ca(OH)_2$ or the like, added as a pH adjustor, yielding $NH_4Cl$, $CaCl_2$ or the like which partly adheres on and around the coal. Accordingly, these byproduct chlorides can be removed by washing with water.

The case where KCl, CaCl$_2$ and the like are used instead of the NaCdl is similar to the above.

The above metals are added in an amount of 10~100 g, preferably at least 30 g per 1 Kg of coal. Namely, the alkali metals or alkaline earth metals are added in an amount of 1~10% by weight, preferably at least 3% by weight.

The catalyst-loaded coal is gasified by a gasifying agent, preferably steam, at 500°~800° C. under a pressure of 1~100 atm. In the reactor, the following reactions are considered to proceed.

$$C + H_2O \rightarrow H_2 + CO \quad (5)$$

$$CO + 3H_2 \rightarrow CH_4 + H_2O \quad (6)$$

$$2C + 4H_2 \rightarrow 2CH_4 \quad (7)$$

$$CO + H_2O \rightarrow H_2 + CO_2 \quad (8)$$

The steam to be supplied as a gasifying agent in the process according to the invention can be mixed with at least one gaseous substance selected from the group consisting of gaseous hydrogen (H$_2$), carbon monoxide (CO), carbon dioxide (CO$_2$), oxygen and air.

As the coal, use may be preferably made of low rank coals such as lignites, brown coals, subbituminous coals and the like. This is because not only that the low coalified coals of less utility value are less expensive, but also these are suitable for catalytic gasification. Elemental analyses, proximate analyses, fuel ratios and calorific values of the coals are shown for reference in Table 1 below.

TABLE 1

|  | Carbon (%) | Hydrogen (%) (dry, ash-free basis) | Oxygen (%) | Water (%) | Volatile matter (%) (dry, ash-free basis) | Fuel ratio | Calorific value (Kcal/kg) |
|---|---|---|---|---|---|---|---|
| Lignite | 65 | 5 | 30 | 30 | 55 | 1 or less | 4,000 |
| Brown coal | 75 | 5 | 20 | 15 | 50 | 1 or less | 5,000 |
| Sub-bituminous | 80 | 6 | 14 | 4 | 50 | 1~2 | 6,000 |

As shown above, according to the process of the invention, town gases and synthetic gases can be produced at a low cost by the gasification of low rank coals which have a low calorific value when burnt as they are.

EXAMPLE 1

Ten grams of Yallourn brown coal was introduced into 200 cc of 1N-NaCl solution having its pH adjusted to 12 and stirring was continued until the pH of the solution became constant. After the stirring was finished, filtration was effected to separate the coal which was then washed twice each with 100 cc of pure water. Thereafter, drying was effected at 107° C. in N$_2$ gas to provide a specimen. Ammonia was used as an alkali for pH adjustment. Na content in the obtained specimen was 4.4% and Cl content was 0.07% by weight. The original contents of Na and Cl in the Yallourn brown coal were 0.05% and 0.07% by weight respectively. The above fact demonstrates that the present invention is very effective as a loading method for coals to take in only Na from NaCl, i.e., the starting material for the catalyst.

(Study of the Experimental Result)

(1) Sodium content and chlorine remnant in the loaded coal:

In the loading stage, the pH of the catalyst solution was rapidly lowered with time. This means that the ion exchange was effected between protons of oxygen functional groups in the coal and the sodium ions. Adjudging the ion exchange to come to an end at the stage where the pH has become constant, the relation between the final pH and the amount of the loaded sodium is shown in Table 2. The sodium content largely depended upon the pH at the end of the ion exchange. The sodium amounted to 2.0 meq/g in the vicinity of pH 10, which approximately corresponds to the amount of carboxyl groups (1.7 meq/g) contained in the Yallourn brown coal. When the pH is loawer than the above, the sodium ions are considered to undergo an ion-exchange with carboxyl groups only. When the pH approaches near 11, the amount of sodium reaches no less than 2.4 meq/g, which suggests that an ion exchange takes place with a part of the phenolic hydroxyl groups (8.0 meq/g) in the coal. Additionally, an experiment wherein the concentration of sodium chloride aqueous solution was varied over 0.3~5N, proved that the sodium content was not substantially influenced insofar as the final pH was equal. Even when the coal had a particle diameter increased to 32~60 meshes, the sodium loading amount remained unchanged.

When calcium hydroxide was used in lieu of ammonia as an alkali for pH adjustor, the amount of the loaded sodium was somewhat decreased (Table 2). Calcium was also loaded together with the sodium and the amount of the loaded calcium became larger than that of sodium when pH rose higher. The total amount of the loaded sodium and calcium was approximately the same as the amount of the loaded sodium in the case where ammonia was used. From the above, it was found that the sodium was able to be loaded even when calcium hydroxide is used in lieu of ammonia.

TABLE 2

| Influence of pH on Na— and Ca—contents of Na—loaded coal | | | | |
|---|---|---|---|---|
| NaCl (N) | Alkaline solution | Final pH | Na (meq/g-dry) | Ca (meg/g-dry) |
| 1 | NH$_3$ | 2.8 | 0.1 | — |
| 1 | " | 5.5 | 0.8 | — |
| 5 | " | 6.2 | 1.2 | — |
| 1 | " | 10.3 | 2.0 | — |
| 1 | " | 11.1 | 2.4 | — |
| 5 | Ca(OH)$_2$ | 6.3 | 0.8 | 0.4 |
| 5 | " | 9.4 | 0.9 | 1.5 |

TABLE 3

|  | Cl contents | |
| --- | --- | --- |
|  | Frequency of washing with water | Cl (wt. %, dry) |
| Original coal | — | 0.07 |
| Na—loaded coal* | 0 | 3.2 |
| Na—loaded coal* | 1 | 0.1 |
| Na—loaded coal* | 2 | 0.07 |

Note:
*5N—NaCl aq. solution and, as a pH adjustor, NH₃, were used. The final pH after completion of the ion exchange was 8.2

When the washing with water was omitted, 3.2% chlorine remained. However, washing twice could decrease the chlorine content to the level of that in the original coal. Thus, it has been found that, when the catalyst loading is performed in accordance with the process of the present invention, the chlorine can be removed only by washing with water and only the sodium can be introduced into coals. As for all other catalyst-loaded coals, the chlorine was able to be decreased by washing with water to substantially the same level as that in the original coals.

(2) Reactivity of the catalyst-loaded coals:

Gasification profiles of the original coal and the catalyst-loaded coal are shown in FIG. 1. The reaction temperature is 923K and the amount of the loaded sodium is about 3% by weight. Coal conversion including volatile matters expressed in weight %, is shown on the ordinate. It is understood that the coals loaded with Na by the ion exchange have extremely large reactivities as compared with the original coals. On the other hand, the coals impregnated and loaded with chlorides exhibit much lower reactivities as compared with the coals loaded with Na by the ion exchange and are substantially the same as the original coals. Miura and Hashimoto found that, when a chloride-loaded carbgon black was steam-gasified at 1091K under 1 atm., the reactivity increased at about the middle of reaction. See, Hashimoto et al., "Relation between the gasification rate of carbons supporting alkali metal salts and the amount of oxygen trapped by the metal", *Fuel*, Vol. 65, pp. 489-494 (April 1986). As the causes of the difference from the experimental results of the present invention, differences in experimental conditions such as partial pressures of steam and reaction temperatures, in properties of carbon, etc., are conceivable, but further investigations are required.

FIG. 2 shows a steam gasification rate at a reaction temperature of 923K. The ordinate shows the rate per initial weight at 20% char conversion. The reaction rate of the coal loaded with catalyst by ion exchange increases with the loading amount, and the rate of the coal loaded with 4 weight % or more catalyst reaches about 20 times or more of the original coal. Comparing with the specimen impregnated and loaded with sodium carbonate, it has been found that a similar reaction rate is also shown. Further, even when the particle diameter of the coal is changed to 32~60 meshes, the reactivity is substantially the same as the case of 100~200 meshes, and thus the effect of the particle diameter is not appreciated in the above range.

(Conclusion)

As a result of investigation of sodium contents, chlorine remnants and steam gasification reactivities on coals which are loaded with a catalyst by utilizing an ion exchange process wherein sodium chloride is used as a starting material for the catalyst, the following facts have been found.

(1) The sodium loading amount largely depends upon the pH of the catalyst solution and when the pH rises, the loading amount also increases.

(2) The chlorine remnants in the loaded coals can be decreased to substantially the same level of the original coals, by a simple operation such as washing with pure water.

(3) The coals loaded with catalysts by ion exchange have extremely large reactivities which are substantially equal to those of the coals impregnated and loaded with sodium carbonate.

EXAMPLE 2

Specimens varying in Na-content were prepared in the same manner as Example 1. The Na-content was controlled by changing the pH and concentration of the NaCl solution. The obtained specimen were steam-gasified in a gasification aparatus equipped with a thermobalance. The reactivity of each specimen is shown in FIG. 2. FIG. 2 shows reactivities of a specimen to which NaCl was added by a usual impregnating method as well as of another specimen to which Na₂CO₃, one of the most active catalysts, was added, for a comparative purpose. From the above, it can be understood that the process of the present invention is very effective as a catalyst loading method wherein NaCl is activated.

EXAMPLE 3

In FIG. 2, there are shown results of using KCl in lieu of NaCl and Ca(OH)₂ as an alkali for pH adjustor. From these, it can be understood that KCl is also effective and Ca(OH)₂ is employable as an alkali for pH adjustor in the present invention.

As illustrated above, since low rank coals can be used as the coal material and alkali metal and/or alkaline earth metal chlorides can be used as a starting material for catalysts, synthetic gases or town gases are producible at a low cost in accordance with the process of the present invention, so that this invention is industrially greatly advantageous.

What is claimed is:

1. A process of catalytic coal gasification by utilizing chlorides, comprising: mixing a coal with an aqueous solution of a chloride of at least one metal selected from the group consisting of alkali metals and alkaline earth metals; adding a pH adjustor to the resultant mixture of the coal and the chloride solution to maintain a pH value in the range between 5 and 12, whereby an ion exchange is effected between said metal(s) and hydrogen in the coal, thereby introducing only said metal(s) as a catalyst into the coal in an amount of 1~10% by weight based on the coal; washing the coal with water to remove chlorides secondarily produced by said ion exchange; and running a gasifying agent at a temperature of 500°~800° C. under a pressure of 1~100 atm. onto the coal loaded with said catalyst and dechlorinated, to effect a catalytic coal gasification reaction.

2. A process as claimed in claim 1, wherein the gasifying agent is at least one gaseous substance selected from the group consisting of steam and mixtures of steam with at least one gas selected from the group consisting of hydrogen gas, carbon monoxide gas, carbon dioxide gas, oxygen gas and air.

3. A process as claimed in claim 1, wherein the coal is at least one low rank coal selected from the group consisting of lignites, brown coals, and subbituminous coals.

* * * * *